United States Patent [19]

Ebinuma et al.

[11] Patent Number: 4,680,696

[45] Date of Patent: Jul. 14, 1987

[54] INK JET RECORDER WITH IMPROVED SYSTEM FOR TRANSPORTING INK TO OR FROM RECORDING HEADS

[75] Inventors: Ryuichi Ebinuma, Hiratsuka; Yoshifumi Hattori, Yamato; Hiroo Ichihashi, Hiratsuka, all of Japan

[73] Assignee: Canon Kabushiki Kaisha, Tokyo, Japan

[21] Appl. No.: 913,613

[22] Filed: Sep. 29, 1986

Related U.S. Application Data

[63] Continuation of Ser. No. 684,117, Dec. 20, 1984, abandoned.

[30] Foreign Application Priority Data

| | | | |
|---|---|---|---|
| Dec. 26, 1983 | [JP] | Japan | 58-244131 |
| Dec. 26, 1983 | [JP] | Japan | 58-244132 |
| Dec. 26, 1983 | [JP] | Japan | 58-244133 |
| Dec. 26, 1983 | [JP] | Japan | 58-244134 |
| Dec. 26, 1983 | [JP] | Japan | 58-244135 |
| Dec. 26, 1983 | [JP] | Japan | 58-244136 |
| Dec. 26, 1983 | [JP] | Japan | 58-244138 |

[51] Int. Cl.[4] .................. G01D 15/18; G01D 15/16

[52] U.S. Cl. .................. 346/75; 346/139 R; 346/140 R

[58] Field of Search .................. 346/75, 140 PD, 139 R; 400/126

[56] References Cited

U.S. PATENT DOCUMENTS

| | | | |
|---|---|---|---|
| 4,394,669 | 7/1983 | Ozawa | 346/75 |
| 4,433,341 | 2/1984 | Thomas | 346/140 PD |
| 4,464,668 | 8/1984 | Kawai | 346/140 PD |
| 4,511,906 | 4/1985 | Hara | 346/140 PD |

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

An ink jet recorder comprises a first tank as an ink supply source, a second tank as an ink supply source for the first tank, and three switching means and a pump arranged in an ink supply path. By controlling the open/close states of the switching means and operation condition of the pump, a print mode, supply mode, pressure mode, circulation mode or store mode can be selectively established.

16 Claims, 22 Drawing Figures

INK JET RECORDER WITH IMPROVED SYSTEM FOR TRANSPORTING INK TO OR FROM RECORDING HEADS

This application is a continuation of application Ser. No. 684,117 filed Dec. 20, 1984, now abandoned.

BACKGROUND OF THE INVENTION

1. Field of the Invention

The present invention relates to an ink jet recorder, and more particularly to an improvement in an ink supply system.

2. Description of the Prior Art

Ink jet recorders are known to have a print mode in which ink is discharged from a head onto a record paper to print characters and a supply mode in which, when the ink in an ink supply tnak used as an ink supply source to the head is depleted, ink is supplied to the ink supply tank from an ink replenishment tank which is separately arranged from the ink supply tank, (Japanese patent publication No. 61934/1980).

Ink jet recorders are also known to have an ink supply path extending from an ink supply tank to a head and returning to the ink supply tank, with switching means and a pump arranged in the supply path so that a recirculation mode for recirculating the ink in the supply path can be established, in addition to the print mode, by controlling the switching means and the pump in order to eliminate air bubbles and clogging in the supply path, (Japanese patent publication No. 159227/1980).

However, in each of those prior art ink jet recorders, only one mode, in addition to the print mode, can be established.

An ink supply system of the ink jet recorder needs joints in a feed pipe for supplying the ink from the supply source to the head and an return pipe for the ink from the head. Those joints are frequently disassembled for maintenance purpose but the disassembling and assembling of the joints are not easy. It is necessary to prevent the ink from flowing out of the pipe when the joint is disassembled. This is an even more serious problem in an ink jet recorder having a plurality of heads arranged.

On the other hand, in a prior art ink jet recorder, the print head, the ink supply tank for the head and the valve and the pump for circulating the ink to remove the air bubbles or clogging are connected through the ink supply tube. Accordingly, those elements form a unitary ink supply system and individual elements cannot be removed individually.

In an ink jet recorder having a plurality of heads to increase a print efficiency, it is necessary to arrange a number of long supply tubes. Thus, the ink supply paths are more complicated. This causes the assembly and disassembly of the elements to be more difficult and raises potential problems of misconnection of the tubes, evaporation of ink and introduction of air into the ink supply paths.

SUMMARY OF THE INVENTION

It is an object of the present invention to provide an ink jet recorder of a simple construction and a high reliability having switching means and a reversible pump arranged in a supply path so that an ink supply mode and an air bubble/clogging remove mode, in addition to a print mode, can be established by controlling the switching state of the switching means and the operation state of the pump.

It is another object of the present invention to provide ink supply connecting members having a valve to be closed by a spring force in one of the connecting members and an end portion for pushing the valve to open it against the spring force by a simple action such as screw driving, in the other connecting member so that the connecting members can be readily attached and removed and the flow-out of the ink in the removal of the connecting members is prevented.

It is other object of the present invention to provide an ink jet recorder having connecting members which can connect supply paths related to head, supply tank and pump which are elements of an ink supply system, so that the supply tubes can be connected in a simple way and the evaporation of the ink in and the introduction of air into the supply paths are prevented.

It is other object of the present invention to provide an ink tank container having a ratchet member and actuation means actuated by engagement with a guide member of a tank, arranged at a removable section so that the ink tank container can be mounted and removed by push-in of the tank and a combination of push-in and pull-out of the tank.

It is a further object of the present invention to provide an ink jet recorder having ink distribution means for distributing ink supplied from an ink supply tank to a plurality of heads and ink collection means for collecting ink and feeding it to the tank, arranged in a vicinity of the heads so that the connection of the tubes is simplified and the evaporation of the ink and the introduction of air are prevented.

DETAILED DESCRIPTION OF THE PREFERRED EMBODIMENTS

Figure 1:
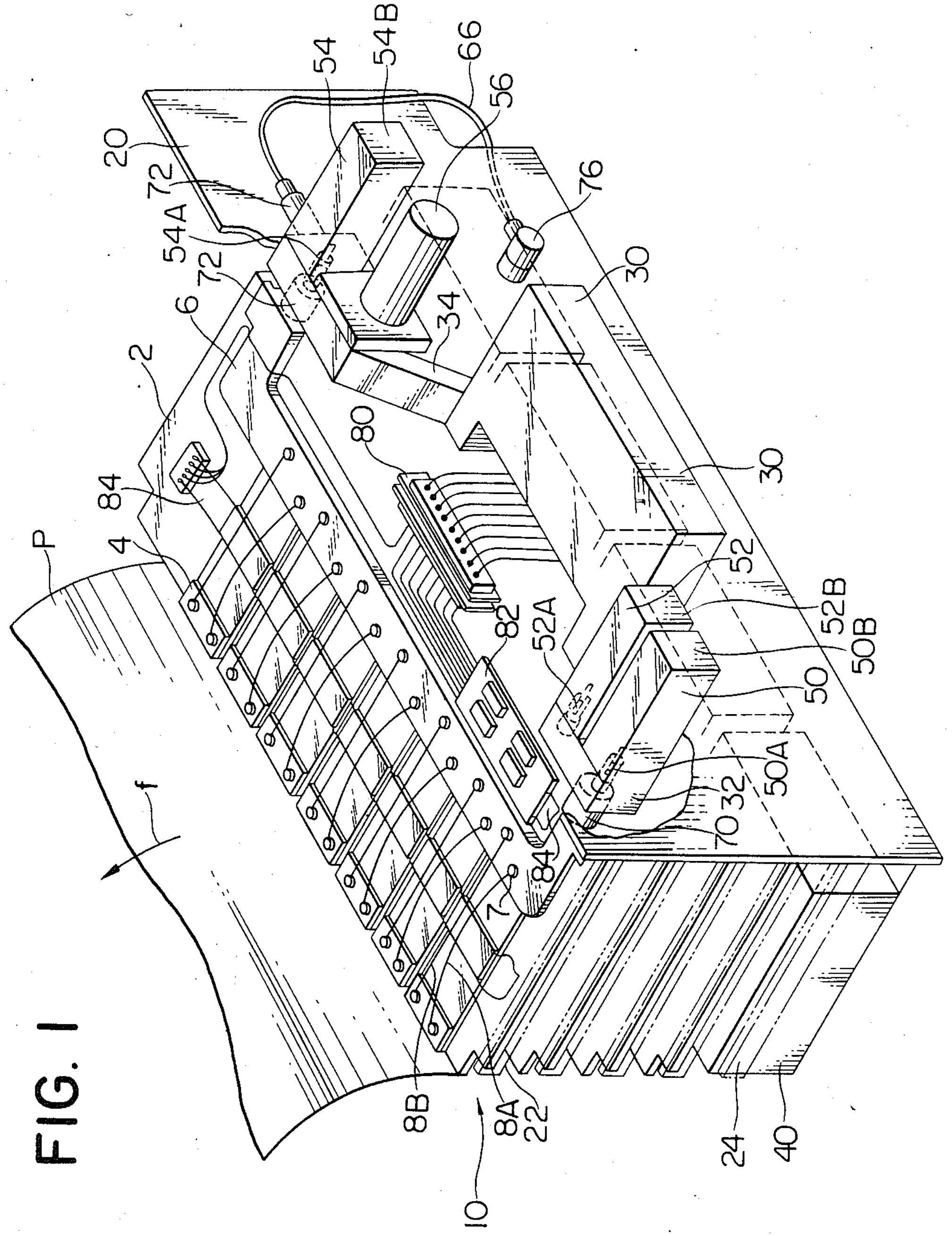
FIG. 1 is a perspective view of an ink jet recorder in accordance with the present invention.

FIG. 1 shows major elements of an ink jet recorder in accordance with the present invention. In the present embodiment, a four-color ink jet printer which has a plurality of print heads arranged widthwise of a record paper and prints on demand is used.

In FIG. 1, P denotes a record paper and an arrow f shows a feed direction of the record paper P. Numeral 2 denotes a unit plate. Seven head elements 4 are arranged on each of front and rear surfaces of the unit plate 2 across an entire width of the record area of the record paper P. Each head element 4 has 128 ink discharge orifices arranged widthwise to face the record paper P. Those head elements 4 are appropriately arranged on both surfaces of the unit plate 2 such that the record areas by the discharge orifices of the head elements 4 arranged on the front side of the unit plate 2 and the record areas by the discharge orifices of the head elements 4 arranged on the rear side of the unit plate 2 do not overlap on each other and attain one line of print. In the record operation, the head elements on the rear side are first driven, and when the recorded area comes to face the head elements on the front side as the record paper P is moved in the direction f, the head elements on the front side are driven so that one line is printed.

Numeral 6 denotes a distributor which comprises a forward path distributor 6A for supplying ink to the head elements 4 through a supply tube 8A and a return path distributor 6B for recovering ink from the head elements 4 through a supply tube 8B. Numeral 7 denotes a joint (D-joint) which connects the distributor 6 with the supply tube 8. Those elements constitute a head unit 10 for one color of the ink. In the present embodiment, four such head units 10 are provided, one for each color of the ink.

Numeral 20 denotes a mother board, numeral 22 denotes a guide member which guides the unit plate 2 to mount the head unit 10 on the mother board, numeral 30 denotes a first tank as an ink supply source to the head elements 4. It stores the ink and is arranged on the opposite side of the mother board 20 to the head unit 10. Numeral 40 denotes a second tank as an ink cartridge tank. It is guided by the guide member 24 on the mother board 20 when it is mounted on the mother board 20. The first tank 30 has a liquid level sensor, and when the liquid level sensor detects that the quantity of ink in the first tank 30 is below a predetermined quantity, the ink is supplied from the second tank 40 to the first tank 30. Numerals 32 and 34 denote arms of the first tank 30. Switching means 50 and 52 such as solenoid valves are arranged on the arm 32 and switching means 54 such as a solenoid valve and a pump 56 are arranged on the arm 34. The switching means 50, 52 and 54 may be stops or gate valves instead of the solenoid valves.

The solenoid valve 50 has a valve 50A which connects a tube path 60 extending to the ink reservoir in the first tank on the arm 32 with a joint (D-V joint) 70 leading to the distributor 6A through the mother board 20. The valve 50A is opened as a solenoid 50B is energized so that an ink flow path is established. The solenoid valve 52 has a valve 52A which connect an air chamber within the first tank 30 with an external atmosphere. The valve 52A is opened as a solenoid 52B is energized to open the air chamber in the first tank 30 to the atmosphere. A dust filter 53 may be arranged on the atmosphere side of the valve 52A.

The solenoid valve 54 is formed on the arm 34 and has a valve 54A which connects a joint 72, which connects a tube path 64 extending to the pump 56 with a tube path 66 extending to the second tank 40, with a D-V joint 74 which extends through the mother board to the distributor 6B. The valve 54A is opened as a solenoid 54B is energized to establish an ink flow path between the pump 56 and the distributor 6B. Numeral 76 denotes a joint (T-C joint) which connects the tube 66 with the second tank 40.

The pump 56 is connected to the second tank through the tube path 64 extending to the valve 54, the tube path 68 extending to the first tank 30 and backflow prevention means such as a check valve, and supplies the ink from the second tank 40 to the first tank 30 through the valve 54A or supplies the ink to the valve 54A depending on the forward or backward operation of the pump 56.

The elements 30, 40, 50, 52, 54 and 56 constitute an ink supply stage for the head unit 10. In the recorder of FIG. 1, four such stages are provided, one for each color of the ink, although only one stage is shown in FIG. 1 to avoid complexity of explanation. The ink supply stage is connected to the head unit 10 through the D-V joints 70 and 74. This connection will be explained later.

Numeral 80 denotes a connector to a control unit not shown and it is mounted on the mother board 20. Numeral 82 denotes an interface board and numeral 84 denotes a flexible wiring board for transmitting a print control signal supplied from the control unit through the connector 80 and the interface board 82, to the head elements 4.

In the ink jet printer of the present invention, since the head unit, the ink supply stage and the electrical wiring are constructed on and around the mother board, the removal of each unit is easy.

The liquid level meter for the first tank 30 is now explained.

Figure 2:
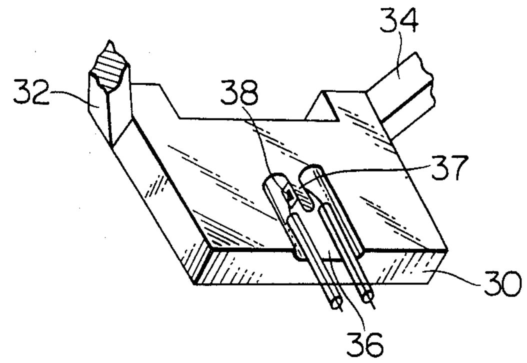
FIG. 2 is a perspective view of a liquid level meter in the ink jet recorder of FIG. 1, FIGS. 3A and 3B are a plan view and sectional view, respectively.
Figure 3A:
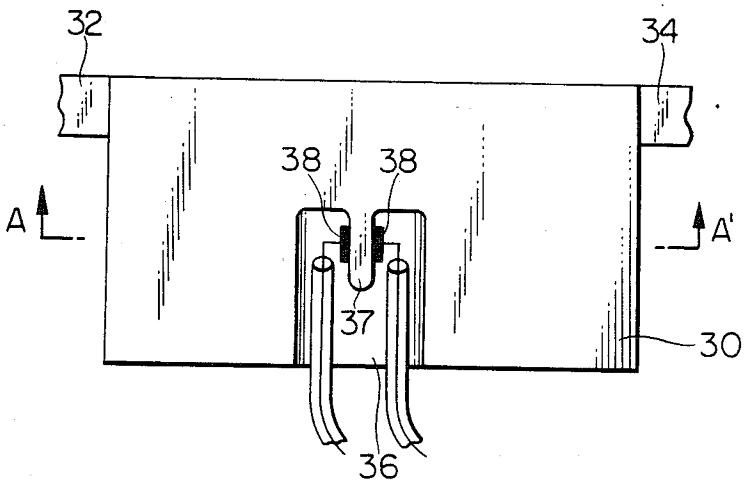
Figure 3B:
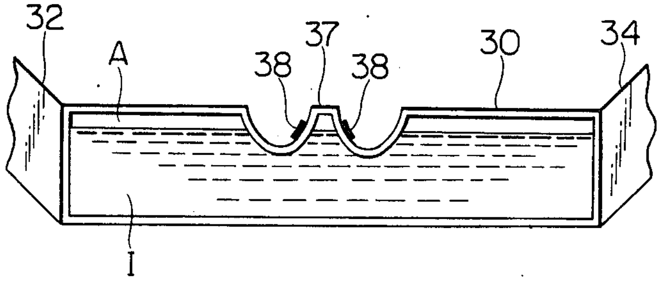

FIG. 2 shows an embodiment of the first tank 30 having the liquid level sensor, FIG. 3A shows a plan view thereof and FIG. 3B shows a sectional view taken along a line A-A' in FIG. 3A. In the present embodiment, the first tank 30 has a recess 36 and a projection 37 rising from the recess. As shown in FIG. 3B, the bottom of the projection 37 is gradually widened and contacts to the ink reservoir I. A pair of sensors, for example, electrodes 38 are arranged to face each other on the outer walls of the projection By detecting an electrostatic capacitance between the electrodes, the level of the ink in the first tank 30 or the presence or absence of ink is detected. When the projection 37 is made of a transparent material, the sensor may be a photocoupler.

As shown in FIG. 3A, the recess 36 and the projection 37 are preferably formed such that the sensors are arranged at the center of the first tank 30.

In the liquid level meter of the present embodiment, the projection 37 is formed in the first tank and the sensors are arranged on the outer walls of the projection substantially perpendicularly to the ink level. Accordingly, when the ink decreases or it is vibrated, the ink does not deposit on the inner wall of the projection and the liquid level can be precisely detected. Since the bottom of the projection spreads as shown in FIG. 3B, the rise of the liquid level on the inner walls of the projection due to surface tension is prevented and the accuracy of the liquid level detection is further improved. Since the sensors are located at the center of the tank, a correct liquid level can be detected even when the tank is slightly inclined.

Figure 4:
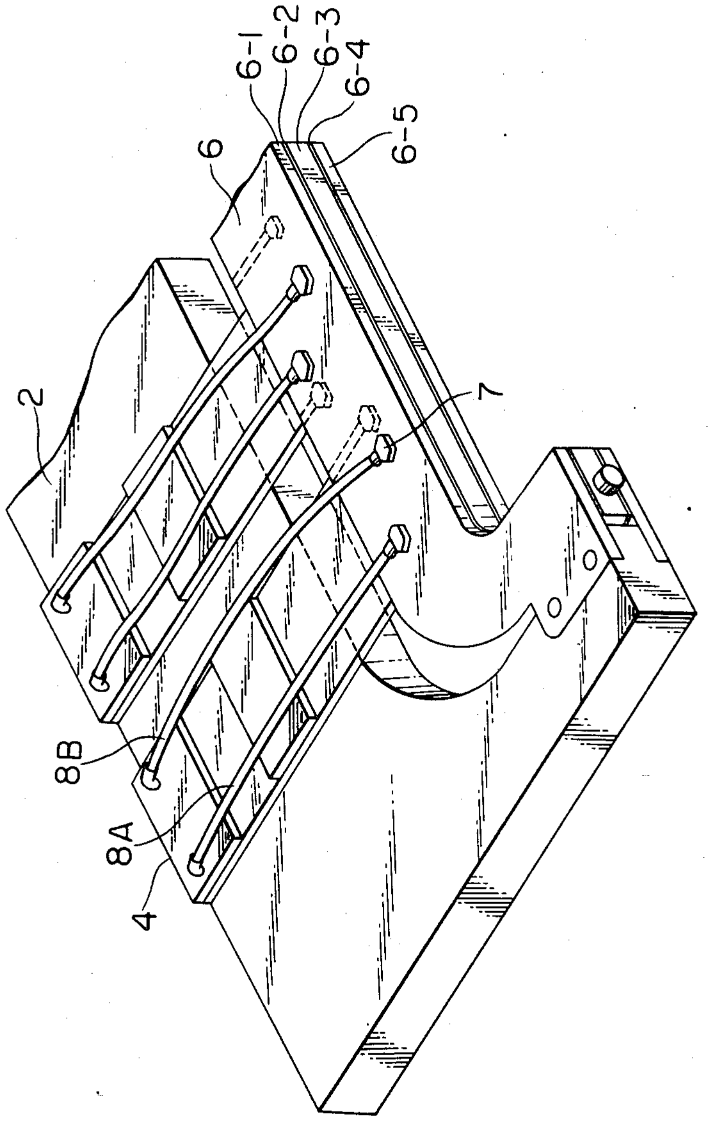
FIG. 4 is a perspective view, partially enlarged, of a head unit including a distributor in the ink jet recorder of FIG. 1, FIGS. 5A–5E show a developed plan view of the distributor.

The distributor is now explained. FIG. 4 is a perspective view, partly enlarged, of the head unit 10 including the distributor 6, and FIG. 5 is a developed plan view of the distributor 6.

Figures 5A, 5B, 5C, 5D, 5E:
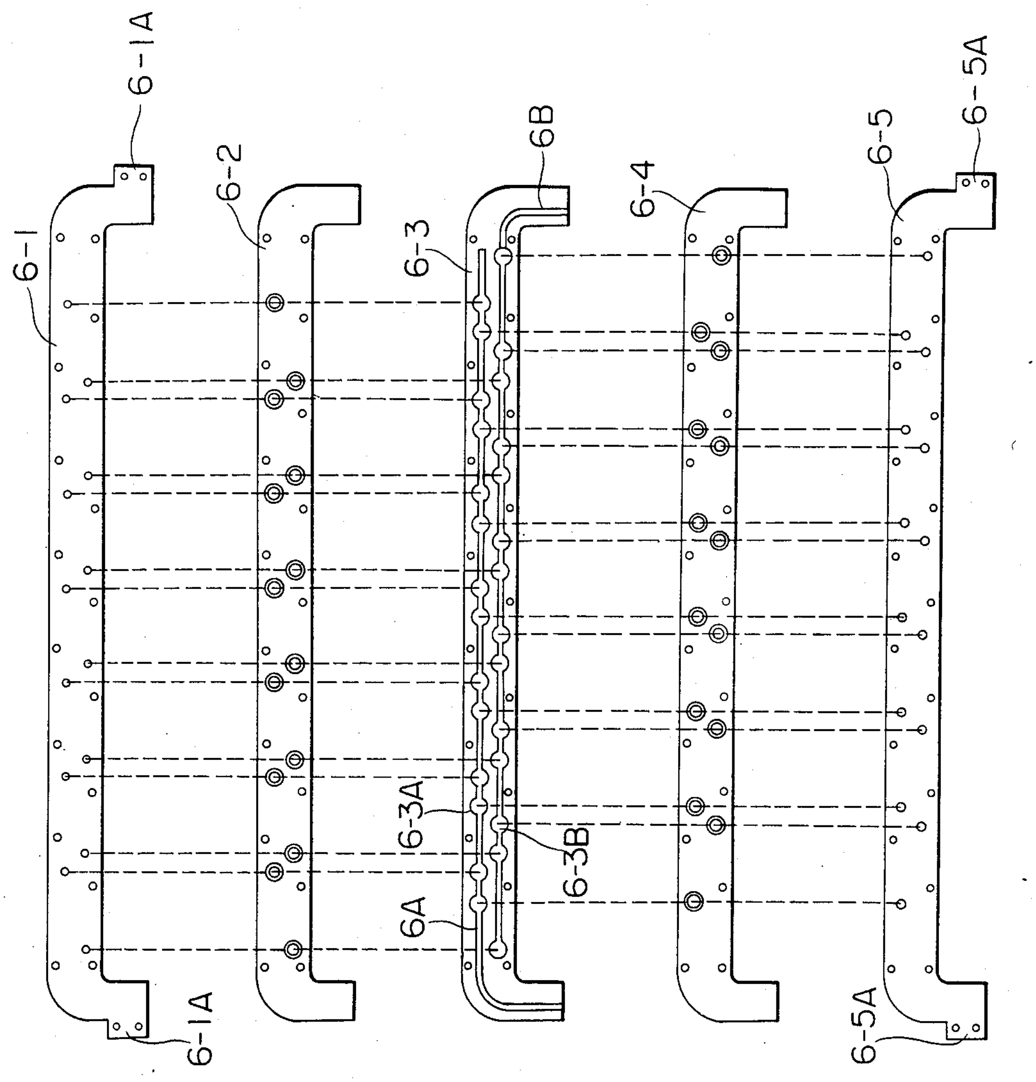

In FIGS. 5A and 5E, numerals 6-1 and 6-5 denote a top plate and a bottom plate, respectively, of the distributor 6, and they have mount areas 6-1A and 6-5A by which they are mounted to the unit plate 2. In FIGS. 5B and 5D, numerals 6-2 and 6-4 denote packing sheets made of, for example, rubber. Numeral 6-3 in FIG. 5C denotes a distributor main body which has tube-shaped distributors 6A and 6B in which ink supply chambers 6-3A and 6-3B are formed to correspond to the supply tubes 8A and 8B. The top plate 6-1, the bottom plate 6-5 and the packings 6-2 and 6-4 are perforated in correspondence to the perforations in the supply chambers 6-3A and 6-3B to form the ink supply path to the D-T joint. In FIG. 5, the correspondence between the supply chambers and the perforations is shown by broken lines.

By the arrangement of the distributor to the head elements, the connection of the tubes of the ink supply path can be simplified.

Figure 6:
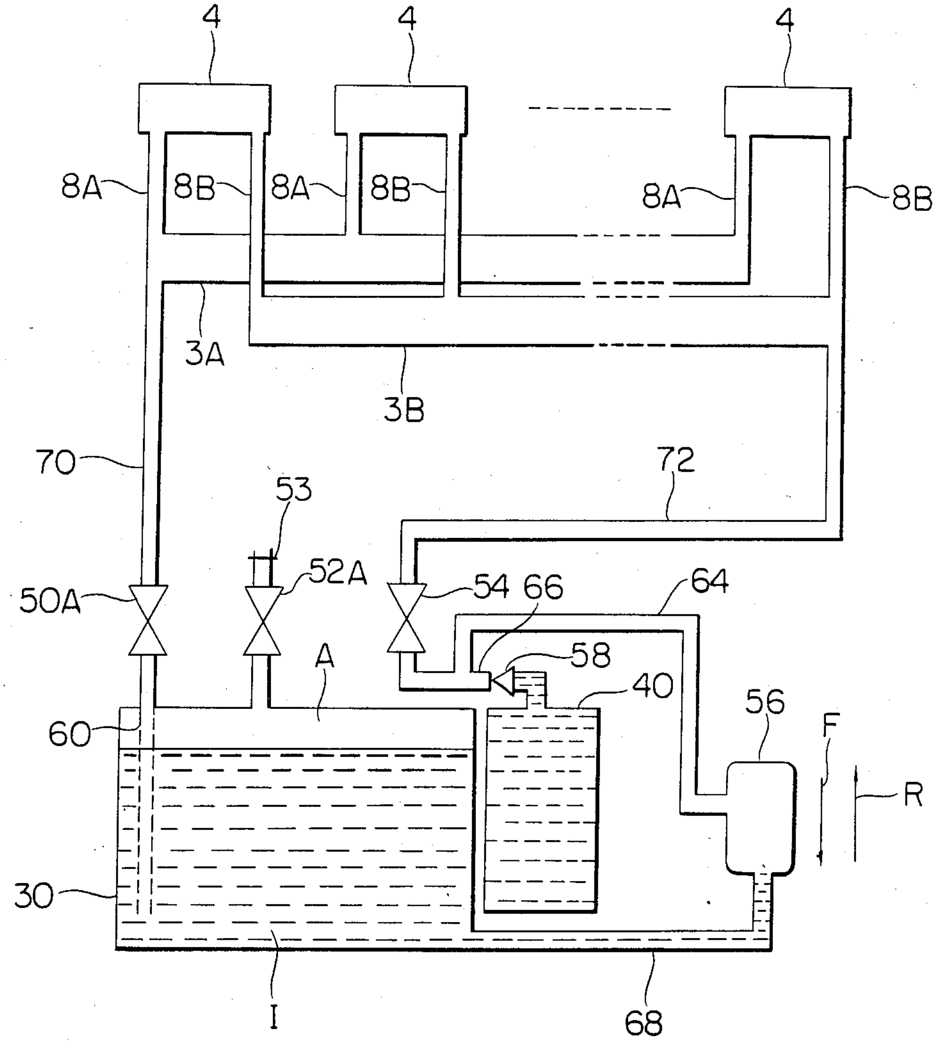
FIG. 6 shows a fluid circuit for an ink supply system in the ink jet recorder of FIG. 1.

FIG. 6 shows an ink supply system having a head unit and an ink supply stage. Numeral 58 denotes a check valve arranged on the T-C joint 76 which connects the second tank 40 with the tube path 66. It regulates the ink flow only to a direction flowing from the second tank 40. Arrow F and R show directions of ink flow when the pump 56 is operated forwardly or reversely, respectively. I and A denote the ink reservoir and the air chamber, respectively, in the first tank 30.

In this ink supply system, by controlling the operation of the pump 56 and the open/close states of the valves 50, 52 and 54 as shown in Table 1, the ink supply system can be set to one of the following modes.

TABLE 1

| | Valve, Pump | | | |
|---|---|---|---|---|
| Mode | 50A | 52A | 54A | 56 |
| Print | O | O | C | stop |
| Supply | O | O | C | forward |
| Circulation | O | O | O | reverse |
| Pressure | C | O | O | reverse |
| Store | C | C | C | stop |

(Note)
O: open
C: close

The respective modes and the ink flows in the respective modes are now explained.

(1) Print mode

Ink necessary for printing is supplied from the first tank 30 to the head element 4. Since the present embodiment is applied to an on-demand type ink jet printer, the ink is not pressurized during printing, and hence the pump 56 is not energized.

In the print mode, as the ink is discharged from the head 4, the ink is supplied to the head 4 through the valve 50A, D-V joint 70, distributor 3A and supply tube 8A.

(2) Supply mode

In the supply mode, the ink is supplied from the cartridge tank 40 to the first tank 30. This mode is used at the start of the use of the ink jet printer and when the quantity of ink in the first tank 30 decreases.

In this mode, the valve 52A is open, the valve 54A is closed and the pump 56 is operated forwardly. Accordingly, the ink is supplied from the second tank 40 to the first tank 30 through the check valve, tube 64, pump 56 and tube 68 in the direction F so that the liquid level of the first tank 30 rises.

(3) Circulation mode

The circulation mode is used when the ink is to be circulated to supply the ink to the heads when the printer is first used, or to remove air bubbles in the heads or the supply paths and refresh the inks therein. This mode is used when the ink jet printer is used after a long period non-usage.

In this mode, the valves 50, 52 and 54 are opened and the pump 56 is operated reversely. Accordingly, the ink flows in the direction R from the first tank 30 through the tube 68, pump 56, tube 64, valve 54A, D-V joint 74, distributor 3B, tube 8B, head 4, tube 8A, D-V joint 70, valve 50A and tube 60 and back to the first tank 30. The air bubbles in the heads 4 or the supply paths are captured into the first tank 30 and discharged from the air chamber A to the atmosphere through the valve 52A.

(4) Pressure mode

When the nozzles of the heads 4 are dried or the nozzles are clogged, the ink is pressurized so that the ink is forcibly discharged from the nozzles to remove the clogging.

In this mode, the valve 50A is closed and the valves 52A and 54A are open, and the pump 56 is operated reversely. Accordingly, the ink is supplied in the direction R from the first tank 30 to the heads 4 through the tube 68, pump 56, tube 64, valve 54A, D-V joint 72, distributor 3B and tube 8B.

(5) Store mode

The store mode prevents evaporation and denaturation of the ink in the first tank 30 and prevents leakage of the ink. It is used during non-print operation or transportation of the ink jet printer.

In this mode, the valves 50A, 52A and 54A are closed and the pump 56 is deenergized. Accordingly, no ink flows in the supply path and the ink does not leak from the printer. Because all valves are closed, there is no risk of leakage of the ink in the tank from the head due to environmental atmospheric condition such as change of temperature, or introduction of air or dust into the supply path.

Figure 7:
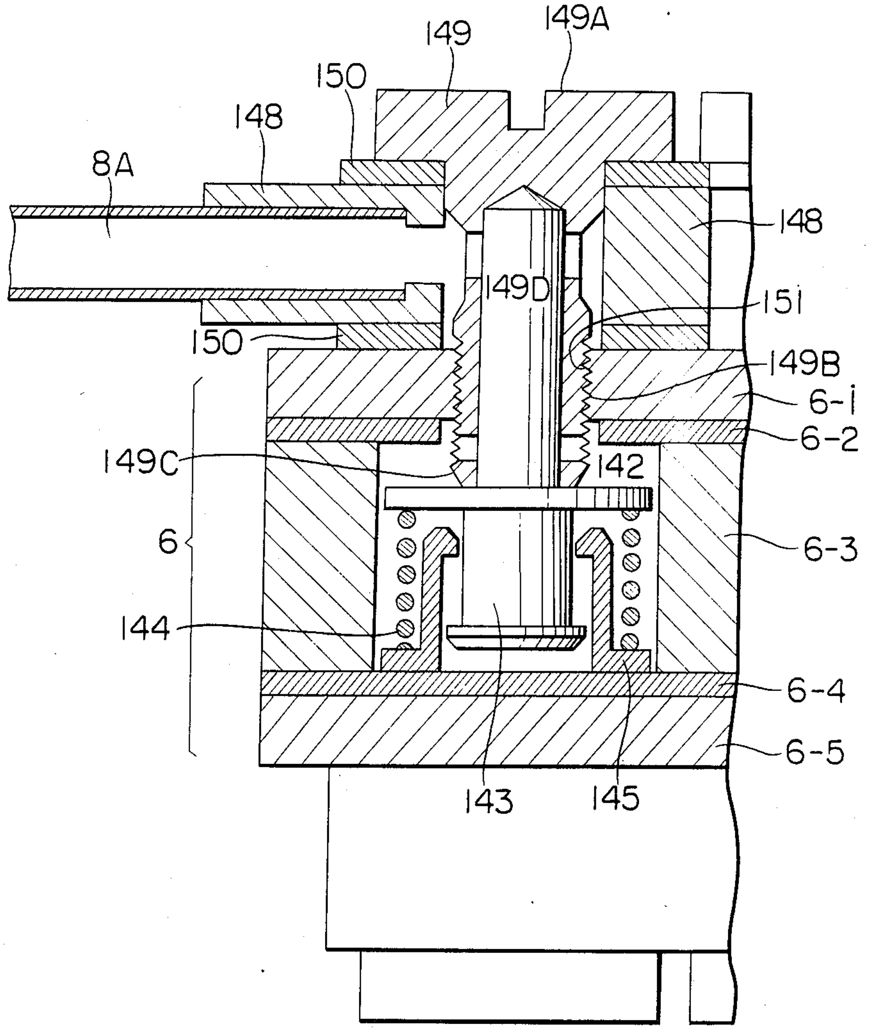
FIG. 7 is a sectional view of a joint between the distributor and a supply tube in the ink jet recorder of FIG. 1, FIGS. 8 and 9 are a perspective view and sectional view of a joint between the distributor and a valve in the ink jet recorder of FIG. 1.

FIG. 7 shows an embodiment of the joint (D-T joint) between the distributor 6 and the ink supply tube 8A or 8B. As described above, the ink flow path in the distributor main body 6-3 has the supply chambers 6-3A and 6-3B of cylindrical shape, and the D-T joints 7 of a similar shape are arranged normally to the plane of the drawing, and the D-T joints 7 are interconnected by the flow paths.

Numeral 143 denotes a blocking member which is vertically slidable in the D-T joint 7. The blocking member 143 has a blocking plate 143A which is normally biased upward by a spring force of a spring 144. Numeral 145 denotes a spring retain member for retaining the spring 144.

A connecting member 147 is formed at the end of the supply tube 8A. The connecting member 147 comprises a tube holder 148 for holding the supply tube 8A in liquid tight relation and a fixing member 149 rotatably fitted to the holder 148. Packings 150 are mounted between the fixing member 149 and the holder 148, and between the holder 148 and the top plate 6-1 of the distributor.

The fixing member 149 is of a male screw shape and has a screw head 149A, thread portion 149B, a split screw end 149C and a communication path 149D for directing the ink from the supply tubes 8A and 8B to the ink paths 142 in the distributors 6A and 6B.

The mount and removal operation of the D-T joint 7 is now explained. FIG. 7 shows a connected state. When the ink path 142 relates to the forward path 6A of the ink supply, the ink can be supplied from the flow path 142 of the distributor 6A to the supply tube 8A through the communicat.ion path 149D of the fixing member 149. When the connecting member 149 of the supply tube 8A is to be removed, the screw head 149A is driven by a screw driver to unscrew the thread portion 149B from the threaded hole 151 of the distributor 6.

As the connecting member is unscrewed, the screw end 149C is pulled up from the connecting point 142A along the threaded hole 151 and the blocking member 143 is pushed up by the force of the spring 144. When the connecting member 149 is removed, the blocking plate 143 of the member 143 abuts against the packing 6-2 by the force of the spring 144 so that the flow-out of the ink from the threaded hole 151 is prevented.

When it is to be connected, the fixing member 149 of the connecting member 147 is screwed into the threaded hole 151 so that the screw end 149C of the member 149 pushes down the blocking plate 143A to establish the ink supply mode.

While the ink supply forward path has been described, the distributor 6 has an ink supply return path in the distributor 6B in parallel to the ink flow path 142 and a joint thereof. Accordingly, a similar connecting member is provided in such joint.

The D-V joint 74 which connects the valve 54 with the distributor 6 through the mother board 20 is now explained.

Figure 8:
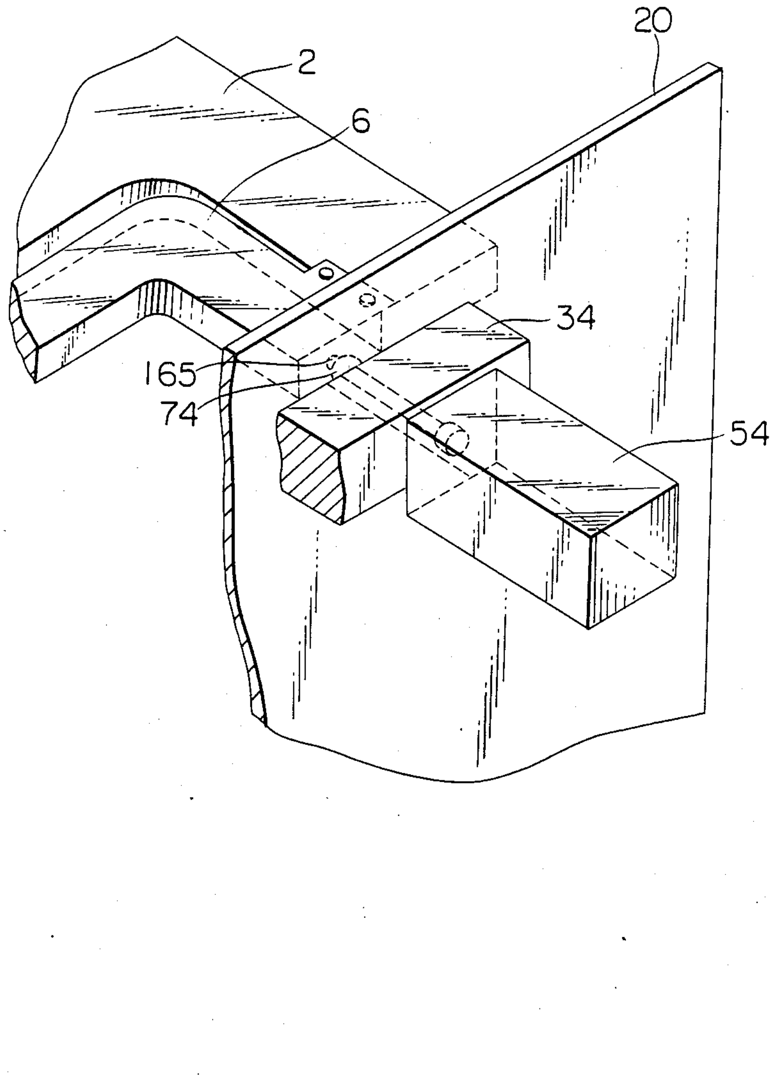

FIG. 8 shows a relative positional relation among the members connected. The distributor 6 fixed to the unit plate 2, and the tank arm 34 of the first tank having the valves 54A of the solenoid valve 54 mounted in the ink path extending from the cartridge tank 40 to the pump 56 are interconnected through the mother board 20. Accordingly, it is necessary that the connecting member 165 of the distributor 6 and the solenoid valve 54 mounted on the tank arm 34 are held on the mother board 20 with the flow paths thereof interconnected.

Figure 9:
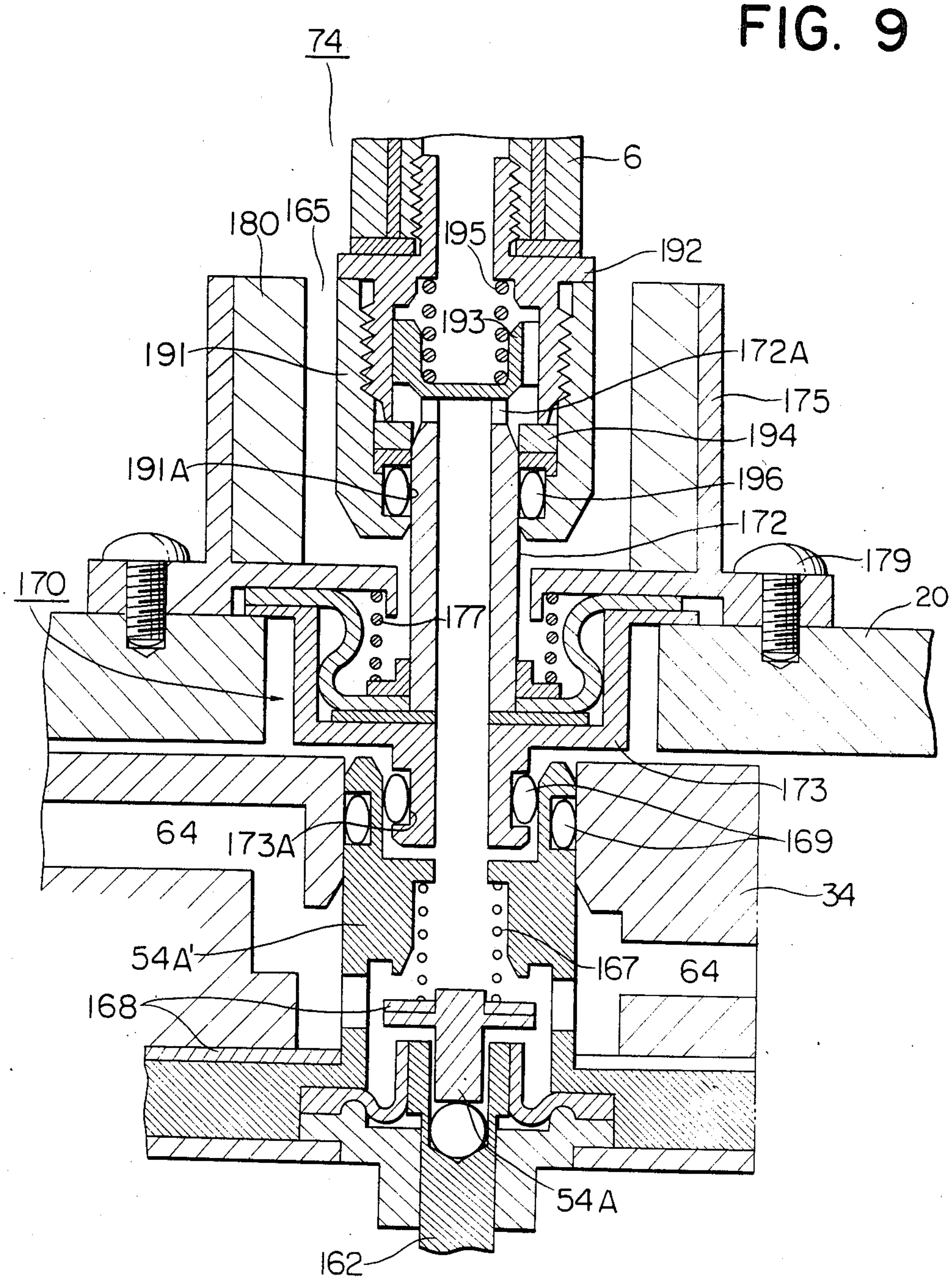

FIG. 9 shows one embodiment of the joint (D-V joint) 74. Numeral 64 denotes the ink path formed in the tank arm 34. The ink from the tank 40 (not shown) is supplied to the first tank through the ink path 64 by the pump 56. Numeral 54A' denotes a valve of a solenoid valve 54 mounted in the ink path 64 and numeral 54A denotes a valve body. When the valve 54A' is open, the valve body is held in the position shown in FIG. 9 by a spring force of a retain spring 167.

Numeral 168 denotes a packing and numeral 169 denotes an O-rings. In the present embodiment, the valve body 166A is pushed into the illustrated position in the tank arm 34 so that liquid tightness with respect to the outside is maintained by the packing 168 and the O-ring 169.

Figure 10:
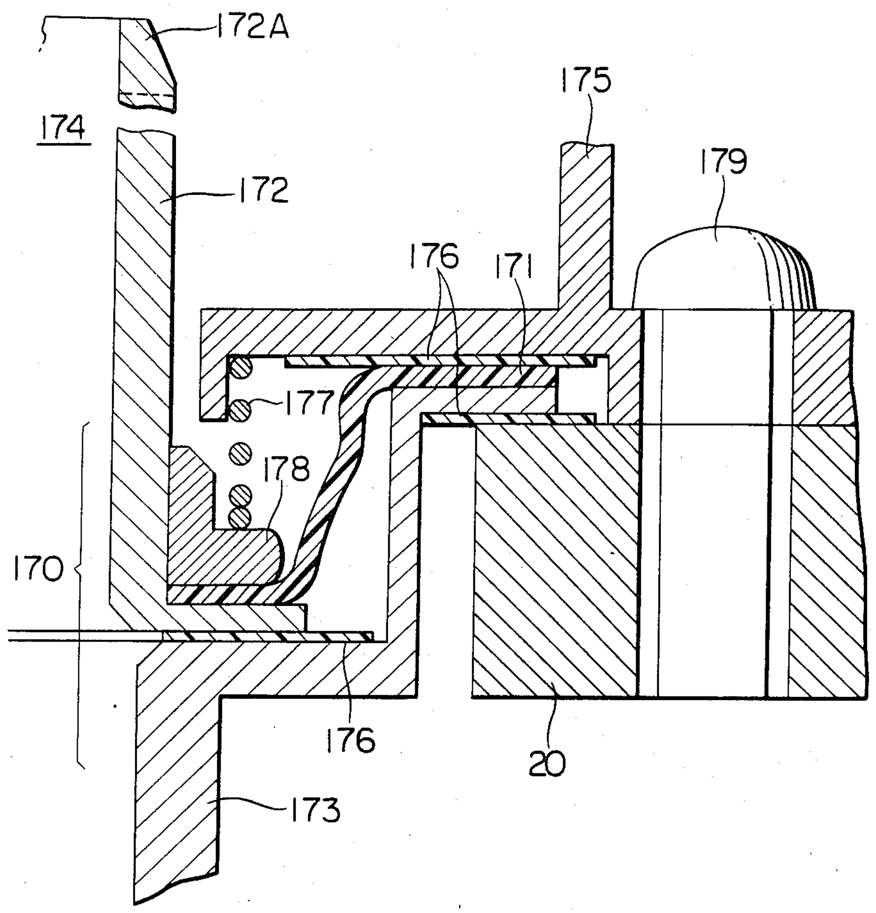
FIG. 10 is a sectional view, partly enlarged, of the joint.

Numeral 170 denotes an interposed connecting member to be held by the mother board 20. A detail thereof is shown in FIG. 10, in which only a right half of the connecting member 170 is shown. Numeral 171 denotes a bellows type seal member, numeral 172 denotes a tubular plug member having an end 172A, and numeral 173 denotes a plug holder. An ink path 174 is formed at centers of the plug member 172 and the plug holder 173.

The seal member 171, plug member 172 and plug holder 173 are assembled as shown in FIG. 10, and sheet packings 176 made of material which imparts slip on a contact surface such as Teflon are interposed between the plug member 172 and the plug holder 173, between the plug holder 173 and the mother board 20 and between a pressing member for holding the connecting member 170 to the mother board 20 and the seal member 171.

Numeral 177 denotes a coil spring disposed between the pressing member 175 and a spring holder 178. The plug member 172 is urged against the sheet packing 176 through the seal member 171 through the spring force of the spring 177. Numeral 179 denotes a screw for fixing the pressing member to the mother board 20.

As shown in FIG. 9, an absorbing material 180 made of water absorbing porous material is arranged on a inner periphery of the pressing member 175 to prevent the ink from dropping from the path 72 when the distributor 6 is removed.

The interposed connecting member is mounted on the mother board in the manner described above and a ring groove 173A is formed in a projecting end of the plug holder 173 on which the tank arm 34 is to be mounted. When the tank arm 34 having the solenoid valve 54 mounted thereon is to be connected with the interposed connecting member 170, tne projecting end of the holder 173 is pushed into the solenoid 54A of the solenoid valve 54 so that the liquid tightness of the mount is held by the O-ring fitted in the ring groove 173A.

The connecting member 165 on the distributor 6 to be connected to the interposed connecting member 170 is now explained. The connecting member 165 comprises an outer shell member 191 having a guide path 191A to guide the plug member i72 of the interposed connecting member 170, a poppet holder 192 screwed into the outer shell member 191 and having a center poppet path 192A which also serves as the ink path, a poppet 193 vertically slidably fitted in the path 192A of the holder 192, and a compressed coil spring 195 for biasing the poppet 193 toward a packing 194.

When the distributor 6 is to be mounted to the interposed connecting member 170, tne split end 172A of the plug member is guided along the poppet path 192A of the connecting member 165 so that the end 172A pushes up the poppet 193 to establish the ink path as shown in FIG. 9. Numeral 196 denotes an O-ring fitted to the outer shell member 191.

When the distributor 6 is to be removed from the interposed connecting member 170, the connecting member 165 together with the distributor 6 is drawn out of the plug member 172. Thus, the plug member 172 retracts along the guide path 191A and the poppet 193 is urged to the packing 194 by the spring 195 so that the liquid tightness is maintained.

The joint (D-V joint) 70 for the valve 50 and the distributor 6 may be constructed in the same manner as shown in FIG. 9, except that the ink path to the second tank 40 is not provided.

Figure 11A:
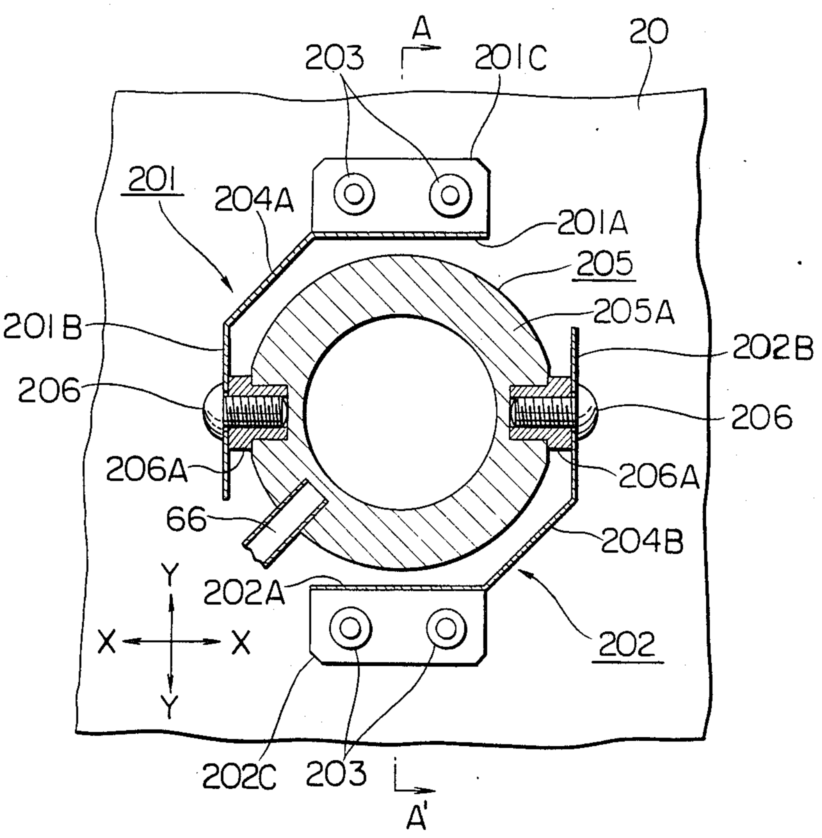
FIGS. 11A and 11B are a front view and sectional view of a joint of a second tank in the ink jet recorder of FIG. 1.
Figure 11B:
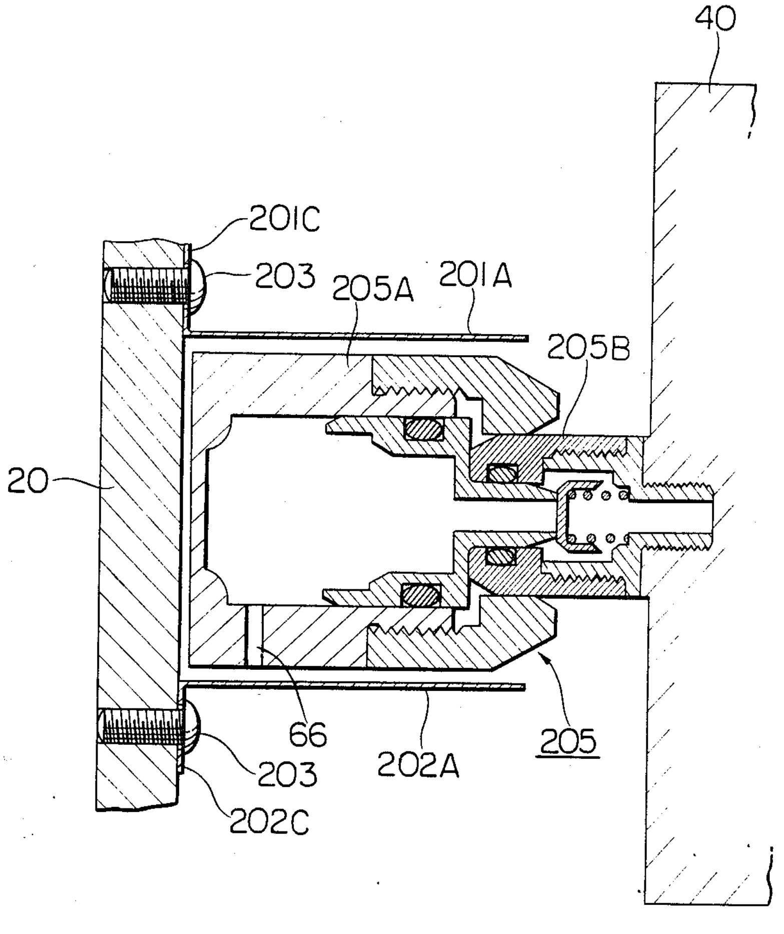

FIGS. 11A and 11B show an embodiment of the joint of the second tank. In the present embodiment, the joint is held by a leaf spring mounted on the mother board 20. Numerals 201 and 202 denote leaf spring members of symmetric shapes. In the present embodiment, the leaf spring members 201 and 202 each has two folds and a folding angle by the two folds is equal to a right angle.

In FIG. 11A, plates 201A and 201B, and the plate 202A and 202B are perpendicular to each other. The plates 201A and 202A have folded mount seats 201C and 202C, respectively, which are fixed to the mother board 20 by screws 203.

Figure 12:
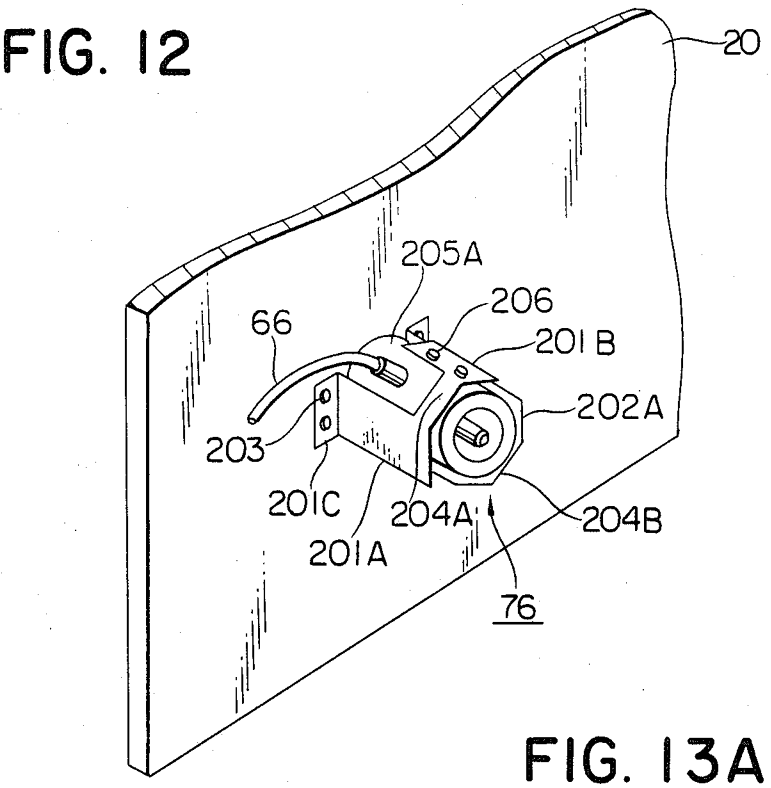
FIG. 12 is a perspective view of the joint.

The plates 201B and 202B are displaceably supported by the plates 201A and 202A, through arms 204A and 204B, respectively, and a connecting member 205 is resiliently held as shown in FIG. 12 by holding it by the plates 201B and 202B.

Numeral 206 denotes fixing screws for fixing the leaf spring members 201 and 202 to the connecting member 205 through the plates 201B a d 202B. In the present embodiment, screw seats 206A are formed in the connecting member 205A to which the ink supply tube 66 is attached, and the fixing screws 206 are screwed to the screw seats 206A to fix the plates 201B and 202B.

The joint operation in the gimbal type joint thus constructed is now explained. In the present embodiment, the connecting member 205A of the ink supply tube 66 is held by the combination of the lead spring members 201 and 202 fixed to the mother board 20 as shown in FIG. 12, and the connecting member 205A is permitted to displace in a plane containing the X—X direction and the Y—Y direction in FIG. 11A by the spring forces of the leaf spring members 201 and 202.

When the connecting member 205B of the second tank 40 is to be fitted to the connecting member 205A from the right side thereof as shown in FIG. 11B, even if the position of the connecting member 205B is slightly shifted vertically or horizontally in the plane of the drawing, such a displacement can be absorbed by the spring members 201 and 202 because the connecting member 205A of the ink supply tube 66 is held by the leaf spring members 201 and 202. Accordingly, non-connection or poor connection is prevented.

Figure 13A:
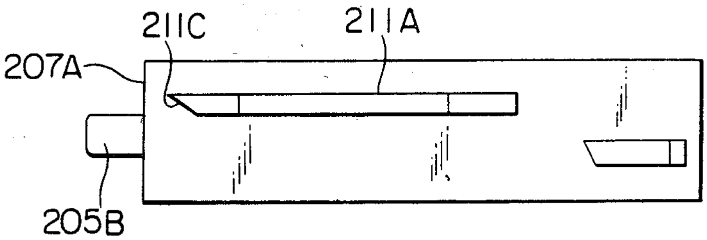
FIGS. 13 and 13B are a side view and plan view of the second tank in the ink jet recorder of FIG. 1.
Figure 13B:
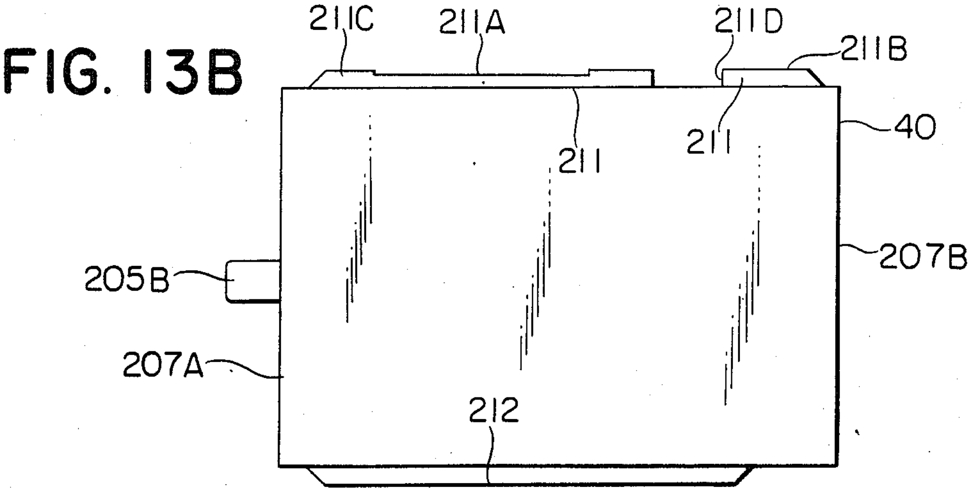

FIGS. 13A and 13B show one embodiment of the second tank 40. The second tank 40 has guide members 211 and 212 on both sides thereof, and a connecting member 205B for connecting the second tank 40 to the ink path is formed on a side 207A.

One guide member 211 has upper and lower members. In the present embodiment, the upper member 211A is longer and positioned inwardly as viewed in the push-in direction, and the lower member 211B is shorter and positioned outwardly as viewed in the push-in direction. The bottoms of the push-in ends 211C and 211D of the members 211A and 211B are tapered into wedge shapes and a space 213 is formed between the other end 211E of the member 211A and an end 211D.

Figure 14:
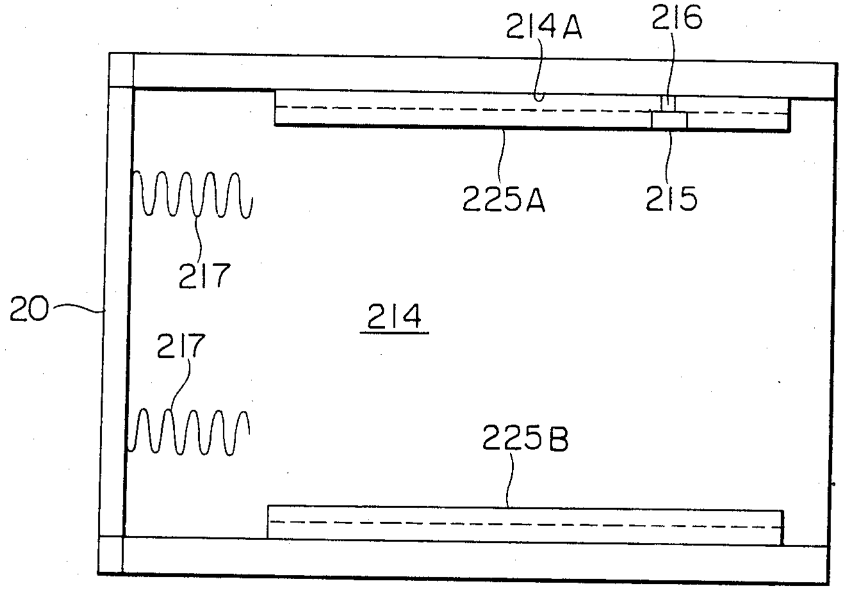
FIG. 14 is a plan view of a container of the second tank in ink jet recorder of FIG. 1.

FIG. 14 shows a container for containing the second tank 40. Numeral 214 denotes a space into which the second tank 40 is pushed and from which it is drawn, numerals 24A and 24B denote tracks for guiding the second tank 40, numeral 215 denotes a ratchet member mounted on a side wall of the space 214 and numeral 216 denotes a rotating shaft of the ratchet member 215.

Figure 15:
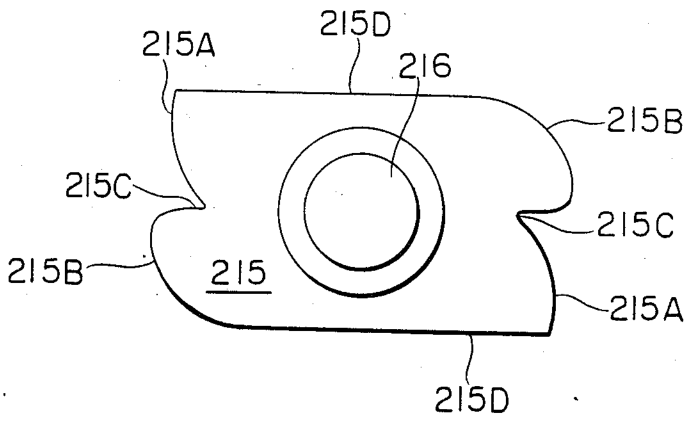
FIG. 15 is a side view of a ratchet as a latch member of the second tank in the ink jet recorder of FIG. 1.

As shown in FIG. 15, the ratchet member 215 has lock grooves 215C formed at axis-symmetric positions by two curves 215A and 215B, and two parallel planes 215D. When the second tank 40 is inserted to the mount position, the ratchet member 215 is brought to the space 213.

As the second tank 40 is inserted into the container along the tracks 215A and 215B, the ratchet member 215 is held by the guide member 211A so that the parallel plane 215D is faced up, and the end 211D of the guide member 211B first abuts against the curve 215A.

The ratchet member 215 is rotated clockwise by the end 211D and when the end 211D is guided to the lock groove 215C, the push-in of the tank 40 is stopped. On the other hand, a compression spring 217 is mounted on the mother board 20 which is inward of the space 114, and when the end 211D of the guide member 211B engages with the lock groove 215C, the compression spring 217 is compressed and tends to return the tank 40.

However, since the end 211E of the guide member 211A abuts against the lock groove 215C as shown in FIG. 15 by the clockwise rotation of the ratchet member 215, the tank 40 is kept in the mount position.

When the tank 40 is to be removed, a front side 207B of the tank 40 is slightly depressed. Thus, the ratchet member 215 is further rotated clockwise by the end 211D of the guide member 211B so that it is disengaged from the tank 40 and the tank 40 is returned by the force of the spring 217 and the ratchet member 215 is rotated clockwise by the end 211E of the guide member 211A and held in the position such that the parallel plane 215D of the ratchet member 215 is parallel to the bottom surface of the guide member 211A. The connecting member 205B of the tank 40 is also drawn out at the joint of the ink supply system not shown.

As explained hereinabove, according to the present invention, the ink supply system is provided with the first tank as the ink supply source, the second tank as the ink supply source to the first tank, and three switching means and the reversible pump in the ink supply path. The open/close states of the switching means and the operation condition of the pump are appropriately controlled so that supply mode, pressure mode, circulation mode and store mode can be set in addition to the print mode. Accordingly, an ink jet printer of simple construction and high reliability is attained.

Further, in accordance with the present invention, in the connecting member for connecting the ink supply system, one connecting member has the valve body which blocks the ink path when it is removed and the other connecting member has the valve actuator which is coupled to the valve body. Accordingly, flow-out of the ink when the connecting member is removed is prevented. Because the connection is attained by threading or inserting one of the connecting members into the other, the mounting and the removal are very easy and efficiency in maintenance and exchange can be improved.

Further, in accordance with the present invention, the mother board is provided as the member to which the elements of the ink supply systems are properly connected. Accordingly, the connection of the supply tubes is simplified, the mounting and the removal of the elements are easy, and the evaporation of the ink in and the introduction of air into the supply paths are prevented.

Further, in accordance with the ink supply system having an exchangeable ink tank of the present invention, the connecting member of the ink tank is held by the resilient support so that the connecting member is displaceable in the predetermined plane. Accordingly, even if the center position displaces when the ink tank is mounted, such displacement can be absorbed by the resilient support. Thus, connection is facilitated and non-connection due to displacement is prevented.

Further, in accordance with the ink jet recorder of the present invention, the distributor is provided as the ink distribution and collection means for the heads. Accordingly, the connection of the ink supply paths is easy and the evaporation of the ink and the introduction of air are prevented.

What we claim is:

1. An ink-jet recorder comprising:

a head having a plurality of head elements for discharging ink to record a pattern;

a first tank for storing ink to be supplied to said head elements;

a second tank for storing ink to be supplied to said first tank; and an ink transport system for transporting the ink among said head elements, said first tank and said second tank;

said ink transport system including:

(a) first distribution means connected to a head port for each said head element;

(b) second distribution means connected to another head port for each said head element;

(c) first transport means arranged between said first tank and said first distribution means to form a first transport path for the ink;

(d) first switching means arranged in said first transport means to selectively block said first transport path;

(e) swcond transport means arranged between said first tank and said second distribution means to form a second transport path for the ink;

(f) second switching means arranged in said second transport means to selectively block said second transport path;

(g) a pump disposed in said second transport means between said first tank and said second switching means and having a first port connecting to said first tank and a second port connecting to said second switching means, said pump being operable in a first direction to transport the ink from said second port to said first port in a second direction to transport the ink from said port to said second port;

(h) third transport means connected to said second tank and having back-flow prevention means for regulating the flow of ink to only the direction flowing from said second tank, said third transport means transporting the ink from said second tank to said second port; and (i) third switching means for opening an air chamber in said first tank to atmosphere while ink is flowing through said first or second distribution means to or from said head elements, whereby ink can be transported through said ink transport system without escaping to the atmosphere.

2. An ink jet recorder according to claim 1 wherein a print mode for recording a pattern is established by opening said first and third switching means, closing said second switching means and stopping said pump.

3. An ink jet recorder according to claim 1 wherein a supply mode for supplying the ink from said second tank to said first tank is established by opening said first and third switching means, closing said second switching means and operating said pump in said first direction.

4. An ink jet recorder according to claim 1 wherein a circulation mode for circulating the ink is established by opening said first, second and third switching means and operating said pump in said second direction.

5. An ink jet recorder according to claim 1 wherein a pressure mode for pressurizing the ink is established by closing said first switching means, opening said second and third switching means and operating said pump in said second direction.

6. An ink jet recorder according to claim 1 wherein a store mode for storing the ink is established by closing said first, second and third switching means and stopping said pump.

7. An ink jet recorder according to claim 1 wherein said first tank includes a portion able to communicate between an ink reservoir and said air chamber and a sensor for detecting a level of the ink stored in said first tank arranged externally of said portion.

8. An ink jet recorder according to claim 1 wherein said area is formed by recessing a portion of an upper surface of said first tank and forming a projection rising from the recess.

9. An ink jet recorder according to claim 8 wherein said area spreads as it goes toward the bottom of said first tank.

10. An ink jet recorder according to claim 1 wherein said ink transport system includes an ink supply connecting member having a connecting element connectable to the ink path, and said ink supply connecting member includes a first connecting member having a valve which blocks said ink path when said connecting element is removed, and a second connecting member having a valve actuator for actuating said valve to connect said ink path when said connecting element is in a connection position.

11. An ink jet recorder according to claim 1 wherein said ink transport system can be separated by separation members which connect said head and other elements of said ink transport system to enable the ink transport therebetween.

12. An ink jet recorder according to claim 1 wherein said second tank is connected to a main body of the recorder by a connecting member for removably connecting said second tank to the main body of the recorder, and said connecting member has a resilient support for resiliently supporting said connecting member and permitting a displacement of said connecting member in a predetermined planer.

13. An ink-jet recorder according to claim 12 wherein said resilient support has a pair of leaf spring members of a symmetric shape, and said connecting member is held by said pair of leaf spring members.

14. An ink jet recorder comprising:

recording means including a head for discharging ink to effect a recording operation;

supply means for supplying the ink to said recording means; and supporting means for removably supporting said recording means and said supply means at either side of said supporting means to connect said recording means and said supply means together, wherein said supporting means includes transfer means for transferring ink between said recording means and said supply means when said recording means and said supply means are mounted on said supporting means.

15. An ink jet recorder according to claim 14, wherein said recording means includes head drive means for driving said head.

16. An ink jet recorder comprising:

a plurality of heads for discharging ink to effect recording;

a tank for storing the ink to be supplied to said heads; and distribution means connected to said tank and said heads and including a first flow path for distributing the ink stored in said tank among said plurality of heads and a second flow path for returning ink from said heads to said tank, whereby ink can flow through said first and second flow paths to or from said heads without escaping to the atmosphere.

* * * * *

UNITED STATES PATENT AND TRADEMARK OFFICE
CERTIFICATE OF CORRECTION

PATENT NO. : 4,680,696

DATED : July 14, 1987

INVENTOR(S) : RYUICHI EBINUMA, ET AL.

It is certified that error appears in the above-identified patent and that said Letters Patent is hereby corrected as shown below:

AT [56] UNDER REFERENCES CITED/U.S. PATENT DOCUMENTS

Line 3, "Kawai" should read --Komai--.

COLUMN 1

Line 18, "tnak" should read --tank--.
Line 21, "tank," should read --tank--.
Line 31, "path," should read --path--.
Line 38, "an" should read --a--.

COLUMN 2

Line 12, "other" should read --another--.
Line 19, "other" should read --another--.

COLUMN 4

Line 49, "projection By" should read --projection. By--.

COLUMN 5

Line 30, "Arrow" should read --Arrows--.

COLUMN 6

Line 11, "period" should read --period of--.
Line 64, "liquid tight" should read --liquidtight--.

UNITED STATES PATENT AND TRADEMARK OFFICE

CERTIFICATE OF CORRECTION

PATENT NO. : 4,680,696

DATED : July 14, 1987

INVENTOR(S) : RYUICHI EBINUMA, ET AL.

It is certified that error appears in the above-identified patent and that said Letters Patent is hereby corrected as shown below:

COLUMN 7

Line 58, "an" should be deleted.
Line 60, "liquid tighteness" should read --liquidtightness--.

COLUMN 8

Line 19, "a" should read --an--.
Line 29, "tne" should read --the--.
Line 31, "liquid tightness" should read --liquidtightness--.
Line 46, "tne" should read --the--.
Line 59, "liquid tightness" should read --liquidtightness--.

COLUMN 9

Line 3, "plate" should read --plates--.
Line 15, "a d" should read --and--.
Line 56, "24A and 24B" should read --225A and 225B--.
Line 67, "215A and 215B" should read --225A and 225B--.

UNITED STATES PATENT AND TRADEMARK OFFICE

CERTIFICATE OF CORRECTION

PATENT NO. : 4,680,696

DATED : July 14, 1987

INVENTOR(S) : RYUICHI EBINUMA, ET AL.

It is certified that error appears in the above-identified patent and that said Letters Patent is hereby corrected as shown below:

COLUMN 11

Line 29, "swcond" should read --second--.
Line 43, "said port" should read --said first port--.

COLUMN 12

Line 18, "said area" should read --an area-.
Line 46, "planer." should read --plane.--.

Signed and Sealed this

Twenty-ninth Day of December, 1987

*Attest:*

DONALD J. QUIGG

*Attesting Officer* *Commissioner of Patents and Trademarks*